(12) United States Patent
Riddick et al.

(10) Patent No.: US 10,698,795 B2
(45) Date of Patent: Jun. 30, 2020

(54) VIRTUAL PAYMENTS ENVIRONMENT

(71) Applicant: Total Systems Services, Inc., Columbus, GA (US)

(72) Inventors: Donald Morford Riddick, Cataula, GA (US); Russell Moore, Opelika, AL (US); Kevin Powers, Box Springs, GA (US)

(73) Assignee: TOTAL SYSTEMS SERVICES, INC., Columbus, GA (US)

( * ) Notice: Subject to any disclaimer, the term of this patent is extended or adjusted under 35 U.S.C. 154(b) by 117 days.

(21) Appl. No.: 15/707,733

(22) Filed: Sep. 18, 2017

(65) Prior Publication Data

US 2018/0081787 A1 Mar. 22, 2018

Related U.S. Application Data

(60) Provisional application No. 62/395,658, filed on Sep. 16, 2016.

(51) Int. Cl.
| | |
|---|---|
| *G06F 11/36* | (2006.01) |
| *G06Q 20/20* | (2012.01) |
| *G06Q 20/14* | (2012.01) |
| *G06Q 20/00* | (2012.01) |
| *G06F 11/34* | (2006.01) |
| *G06Q 40/00* | (2012.01) |
| *G06Q 20/40* | (2012.01) |

(52) U.S. Cl.
CPC ...... *G06F 11/3664* (2013.01); *G06F 11/3409* (2013.01); *G06F 11/3476* (2013.01); *G06Q 20/00* (2013.01); *G06Q 20/14* (2013.01); *G06Q 20/20* (2013.01); *G06Q 20/4016* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 9,449,320 B1 * | 9/2016 | Walters | G06Q 20/40 |
| 2006/0015852 A1 * | 1/2006 | Parkinson | G06F 11/3688 717/126 |
| 2008/0165951 A1 * | 7/2008 | Somers | G06Q 10/0637 380/2 |
| 2009/0294526 A1 * | 12/2009 | Maw | G06K 7/0008 235/380 |

(Continued)

*Primary Examiner* — Isaac T Tecklu
(74) *Attorney, Agent, or Firm* — Ballard Spahr LLP

(57) ABSTRACT

A virtual payments environment can be used to simulate and test performance of a payments system. A plurality of characteristics and settings can be used to generate and/or determine one or more scenarios associated with a payments environment. The one or more scenarios associated with the payments environment can comprise a plurality of activity engines that simulate real-word components of a payments environment. Payment information can be introduced to the one or more scenarios and activity engines can be used to test and/or verify the integrity of the payment information as it traverses a transactional path through the payments environment. Performance data associated with the payment information can be accessed and review in order to determine a number or successes and/or failures associated with processing the payment information as it transverses the payments environment.

20 Claims, 6 Drawing Sheets

(56) References Cited

U.S. PATENT DOCUMENTS

| | | | |
|---|---|---|---|
| 2011/0016454 A1* | 1/2011 | Paintal | G06F 11/3664 |
| | | | 717/127 |
| 2011/0276531 A1* | 11/2011 | Bellamy, III | G06Q 20/4016 |
| | | | 706/47 |
| 2013/0204775 A1* | 8/2013 | Midkiff | G06Q 20/10 |
| | | | 705/39 |
| 2015/0039512 A1* | 2/2015 | Adjaoute | G06N 20/00 |
| | | | 705/44 |
| 2015/0269582 A1* | 9/2015 | Simmons | G06Q 20/202 |
| | | | 705/21 |
| 2016/0342994 A1* | 11/2016 | Davis | G06Q 20/382 |
| 2017/0147481 A1* | 5/2017 | Doss | G06F 11/3684 |
| 2017/0200148 A1* | 7/2017 | Ulrich | G06Q 20/351 |
| 2017/0300903 A1* | 10/2017 | Mori | G06Q 10/067 |

\* cited by examiner

| Identifier Information 204 | Location Information 206 | Transactional Information 208 | Timing Information 210 | Performance Data 212 |

VIRTUAL PAYMENTS ENVIRONMENT

CROSS REFERENCE TO RELATED PATENT APPLICATION

This application claims priority to U.S. Provisional Application No. 62/395,658 filed Sep. 16, 2016, herein incorporated by reference in its entirety.

BACKGROUND

Evaluating payment systems requires accessing highly secure and regulated payment data and systems, and is not known to test actual transactional volumes. For example, payment system testing relies on historical data, thus, it is difficult to perform quality and performance testing of proposed payment systems based on actual transactional volumes and projected data. Consequently, identifying potential faults in a payments system and determining a root cause of payment system failures in challenging. These and other shortcomings are addressed by the methods and systems described herein.

SUMMARY

It is to be understood that both the following general description and the following detailed description are exemplary and explanatory only and are not restrictive. Provided are methods and systems for a virtual payments environment.

The present disclosure relates to methods and systems for providing a virtual payments environment. A device can be configured with and/or be associated with a user interface that enable a user to execute one or more scenarios within a virtual payments environment. The user can use the user interface to provide and/or select payments environment characteristics such as hardware components, payment types, payment card types, commercial volumes, etc. The characteristics can be used to determine a plurality of scenarios associated with a payments environment. A user can select and/or cause generation of a scenario associated with a payment environment such as commercial activity during a specific time window such as a seasonal event. For example, a user can select and/or cause generation of a scenario associated with a payment environment such as commercial activity during Black-Friday, a Christmas Holiday season, a maintenance downtime, a back-to-school shopping period, etc.

The scenario can model and/or comprise a plurality of activities associated with components of a payments environment. The components of the payments environment can be represented by a plurality of activity engines. The plurality of activity engines can comprise a plurality of blockchains that identity, timestamp and store events/transactions associated with the activity engines. The blockchains can create and/or be associated with a ledger (e.g., private ledger, open ledger, distributed ledger, shared ledger, public ledger, etc.) that is in a verifiable and persistent. The scenario can model and/or comprise activities associated with a point-of-sales (POS) device, a payment gateway, a payment processor, a network, or any other component/device associated with a payments environment.

Payment information (e.g., payment packets) can be introduced to the scenario. The payment information can include payment card industry data such as an account number, a payment card status, a verification code, a merchant identifier, cryptocurrency, foreign exchange currency information, a combination thereof, and the like. The payment information can be processed according to the plurality of activities associated with the components of the payments environment. For example, the payment information can be processed by one or more activity engines associated with a point-of-sales (POS) device, a payment gateway, a payment processor, a network, combinations thereof, and the like. The one or more activity engines can be associated with a transactional path that that payment information follows through the payments environment according to a scenario. The payment information can be tagged with an identifier associated with each activity engine of a plurality of activity engines associated with the transactional path.

Performance data associated with the payment information and/or payments environment (e.g., scenario) can generated, stored, and reviewed. The performance data can be associated with the transactional path that that payment information follows through the payments environment according to a scenario. The performance data can indicate a success/failure in processing the payment information, where along the transactional path the success/failure occurred, statistical data, and or any other analytical data associated with the payment information. The performance data can be displayed via a graphical user interface (GUI), application, web browser, and a combination thereof.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
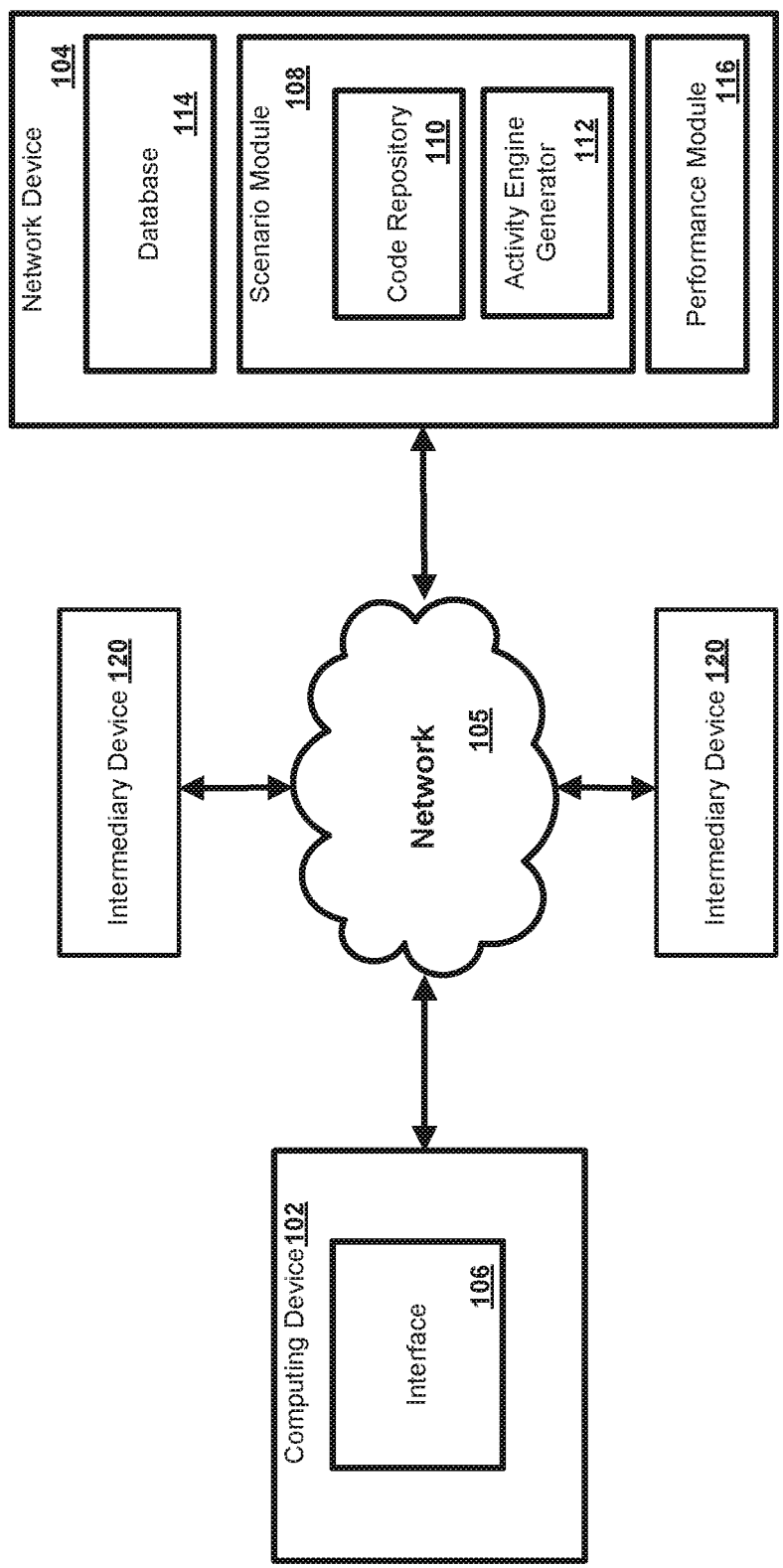
FIG. 1 is a block diagram of various aspects of an example system.

Before the present methods and systems are disclosed and described, it is to be understood that the methods and systems are not limited to specific methods, specific components; or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The present disclosure relates to methods and systems for providing a virtual payments environment. A device, such as a computing device, user device, network device, computer, laptop, smart device, etc., can be configured with and/or be associated with a user interface. The user interface can comprise a graphical user interface (GUI), application, web browser, or a combination thereof. The user interface can enable a user to execute one or more scenarios within a payments environment (e.g., virtual payments environment). The user can use the user interface to provide and/or select payments environment characteristics such as hardware components (e.g., point-of-sale devices, automatic teller machines, card processors, etc.), payment types (e.g., cryptocurrency, payment card, etc.), payment card types (e.g., credit card, debit card, rewards cards, gift cards, etc.), commercial volumes, etc. The characteristics can be used to determine a scenario. For example, a user can provide scenario information (e.g., a code) associated with a payment environment, select a predetermined scenario associated with a payment environment, or cause a scenario associated with a payment environment to be generated. Each scenario can be associated with a time window (e.g., a start time, an end time, a duration, etc.). A user can select and/or cause generation of a scenario associated with a payment environment such as commercial activity during a time window such as a seasonal event. For example, a user can select and/or cause generation of a scenario associated with a payment environment such as commercial activity during Black-Friday, a Christmas Holiday season, a maintenance downtime, a back-to-school shopping period, etc. The user can select and/or cause generation of events associated with the scenarios (e.g., blockchains) that are either typical or atypical in a payments environment. For example, the user can select and/or cause generation of events such as fraudulent transactions (payment card theft, payment card replication, unauthorized access to a payment account), an incorrect pin used in association with a payment card (e.g., credit card, debit card, rewards cards, gift cards, etc.), merchant type payment acceptance/rejection (e.g., merchants that only accept certain forms of payments, etc.).

The scenario can model and/or comprise a plurality of activities associated with components of a payments environment. The scenario can model and/or generate a plurality of activity engines associated with components of a payments environment. Each activity engine of the plurality of activity engines can comprise a plurality of blockchains that identity, timestamp and store events/transactions associated with the activity engines. Thus the blockchains can create and/or be associated with a ledger (e.g., private ledger, open ledger, distributed ledger, shared ledger, public ledger, etc.) that is in a verifiable and persistent. The payments environment (e.g., one or more activity engines) can be linked to and/or in communication with real-world devices that the activity engines model and/or represent. For example, an activity engine that simulates a point-of-sales (POS) device can be in communication with a POS device maintained and/or associated with a merchant, and/or an activity engine that simulates a payment processor can be in communication with a payment processor maintained and/or associated with a payment processing entity such as Cayan®, Leaders Merchant Services®, Square®, Payment Cloud®, North American Bancard®, and the like.

The scenario can model and/or comprise activities associated with a point-of-sales (POS) device, a network, a payment gateway, a payment processor, a network, combinations thereof, and the like. For example, the scenario can model and/or generate an activity engine associated with one or more POS devices such as barcode scanners, radio frequency identification (RFD) devices, touchscreen devices, magnetic stripe readers, electronic funds transfer (EFT) devices, digital weighing scales, POS receipt printers, line displays, and cash drawers, and the like. The scenario can comprise activities associated with a POS device such as currency acceptance, keypad and/or control inputs, chip card reader inputs, swipe card inputs, combinations thereof and the like. The scenario can model activities and/or generate an activity engine associated with a payment gateway. The scenario can model activities and/or generate an activity engine associated with a payment gateway such as currency exchange (e.g., an exchange between fiat currency and cryptocurrency), management of payment data (e.g., transaction data, payment card industry data, payment settlement request, etc.) communicated between a POS device and a payment processor. The scenario can model activities and/or generate an activity engine associated with a payment processor. The scenario can model activities and/or generate an activity engine associated with a third party entity and/or device, configured as a payment processor. The payment processor can manage/verify payment card (e.g., bank card, credit card, debit card, gift card, etc.) associations with merchants and financial institutions, determine payment authorization information, and determine payment settlement information. The scenario can model and/or generate an activity engine associated with a network (e.g., a network activity engine). A network activity engine can connect and/or simulate a connection between the plurality of activity engines (e.g., POS activity engine, payment gateway activity engine, payment processor activity engine, etc.). A network activity engine can simulate network infrastructure and network related events and occurrences such as network outages, network congestion, changes in network parameters and configurations, network connectivity issues, network traffic management, combinations thereof, and the like. As such, the payments environment can be configured, based on one or more performance settings, to queue, buffer, discard, delay and the like, payment information as the payment information is processed by each activity engine of the plurality of activity engines.

A user of the device (e.g., computing device, user device, network device, computer, laptop, smart device, etc.) can use the user interface (e.g., graphical user interface (GUI), application, web browser, etc.) to introduce the payment information (e.g., payment packets) to the scenario/payments environment. The payment information can include payment card industry data such as an account number, a payment card status, a verification code, a merchant identifier, cryptocurrency, foreign exchange currency information, a combination thereof, and the like. The payment information can be processed according to the plurality of activities associated with the components of the payments environment. The payment information can be processed via the activity engines associated with the payments environment. For example, the payment information can be processed by one or more activity engines associated with a point-of-sales (POS) device, a payment gateway, a payment processor, a network, combinations thereof, and the like. The one or more activity engines can be associated with a transactional path that that payment information follows through the payments environment according to a scenario. The payment information can be tagged with an identifier associated with each activity engine of a plurality of activity engines associated with the transactional path. For example, the payment information can be tagged with an identifier associated with each activity engine of a plurality of activity engines that indicates whether processing the payment information by the respective activity engine was either a success or a failure. The plurality of activity engines can be configured to accept, reject, or queue, payment information for processing based on the identifier and/or other characteristics of the payments environment such as components, payment types (e.g., cryptocurrency, payment card, etc.), payment card types (e.g., credit card, debit card, rewards cards, gift cards, etc.), commercial volumes, etc.

The user can access the device (e.g., computing device, user device, network device, computer, laptop, smart device, etc.) or another device (e.g., computing device, user device, network device, computer, laptop, smart device, etc.) in communication with the device to retrieve performance data associated with the payment information and/or payments environment (e.g., scenario). The performance data can be associated with the transactional path that that payment information follows through the payments environment according to a scenario. For example, the payments environment can generate performance data associated with one or more blockchains associated with an activity engine of the payments environment. The performance data can indicate a success/failure in processing the payment information, where along the transactional path the success/failure occurred (e.g., pre-activity engine, post-activity engine, during an activity engine process/activity), statistical data, and or any other analytical data associated with the payment information. The performance data can be displayed via a graphical user interface (GUI), application, web browser, and a combination thereof. The performance data can be used to modify, compare, and reconcile real-world data (e.g., a public ledger, payment card transaction history) associated with a real-word payment product (e.g., a payment card, cryptocurrency, etc.).

A system can be configured to provide services such as virtual payments environment and simulation services to a computing device. FIG. 1 illustrates various aspects of an exemplary environment in which the present methods and systems can operate. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a computing device 102 in communication with a network device 104 and an intermediary device 120, for example. The network device 104 can be disposed locally or remotely relative to the computing device 102, and or the intermediary devices 120. As an example, the computing device 102, the network device 104, and the intermediary device 120 can be in communication via a private and/or public network 105 such as the Internet, a wide-area network, a local area network, combinations thereof, and the like. Other forms of communications can be used such as wired and wireless telecommunication channels, for example.

In an aspect, the computing device 102 can be an electronic device such as a computer, a smartphone, a laptop, a tablet, a smart device, a display device, or other device capable of communicating with the network device 104 and the intermediary device 120. As an example, the computing device 102 can comprise an interface 106 for providing an interface to a user to interact with the computing device 102 and/or the network device 104 and the intermediary device 120. The interface 106 can be any interface for presenting and/or receiving information to/from the user, such as user performance data associated with activity engines of a virtual payments environment. An example interface may be a communication interface such as a graphical user interface (GUI), application, web browser (e.g., Internet Explorer, Mozilla Firefox, Google Chrome, Safari, or the like), or a combination thereof. Other software, hardware, and/or interfaces can be used to provide communication between the user and one or more of the computing device 102, the network device 104, and the intermediary device 120. As an example, the interface 106 can transmit, request or query various files to/from a local source and/or a remote source. As a further example, the interface 106 can transmit/receive data (e.g., payments environment hardware characteristics, payments environment performance characteristics, payments environment network criteria and characteristics, payments environment user interaction characteristics, payments environment payment information, payments information, payments processing information, financial ledger information, etc.) to a local (e.g., internal) or remote data source and/or device such as the network device 104 and the intermediary device 120.

The network device 104 can be a device such as a cloud-based device, a server, and the like for communicating with the computing device 102. In an aspect the computing device 102 and the network device 104 can be a single device. In an aspect the computing device 102 and the network device 104 can be separate devices. The network device 104 can communicate with the computing device 102 for providing data and/or services. For example, the network device 104 can provide virtual payments environment and simulation services. The network device 104 can allow the computing device 102 to interact with remote resources such as data, devices (e.g., intermediary device 120), and files. As an example, the network device 104 can be configured as (or disposed at) a central location, which can receive data/ information (e.g., payments environment hardware characteristics, payments environment performance characteristics, payments environment network criteria and characteristics, payments environment user interaction characteristics, payments environment payment information, payments information, payments processing information, financial ledger information, etc.) from multiple sources. The network device 104 can combine the data/information (e.g., payments related) from the multiple sources (e.g., merchant point-of-sales-devices, payment gateway devices, payment processor device, etc.) and can distribute the data/ information to the computing device 102

The network device 104 can manage the communication between the computing device 102 and a database 114 for sending and receiving data therebetween. The database 114 can store a plurality of files (e.g., code, simulation code, virtual payments environment settings, virtual payments scenario information, etc.), identifiers (e.g., user identifiers, device identifiers, system component identifiers, etc.) or records, and other information. The computing device 102 can request and/or retrieve a file from the database 114. In an aspect, the database 114 can store information relating to the computing device 102 such as simulation and/or scenario settings/preferences and the like. The database 114 can be disposed remotely from the network device 104 and accessed via direct or indirect connection. The database 114 can be integrated with the computing system 104 or some other device or system.

The network device 104 can comprise a scenario module 108. The scenario module 108 can generate a virtual payments environment. A virtual payments environment can be a simulated environment/scenario comprising typical/atypical payments events (e.g., payment card swipe, payment card industry data, errors associated with payment systems, payment data transmission, payment data authorization, cryptocurrency management, fraudulent payment activity, etc.) and components (e.g., point-of-sales devices, payment gateways, payment processors, etc.). The scenario module 108 can generate code and/or process code (e.g., compiled code, uncompiled code, etc.) and based on the code, generate a virtual payments environment. For example, executable computer software instructions may be implemented in a scripting language (e.g., JavaScript) as code modules defining certain activities (e.g., activity engines, etc.). In an aspect, any suitable coding/scripting language and/or technique can be used such as Java, Python, Assembler, Cobol, and the like. The code modules (e.g., activity engines, etc.) may be stored in a code repository 110. The scenario module 108 can generate/provide a virtual payments environment based on data (e.g., payments environment hardware characteristics, payments environment performance characteristics, payments environment network criteria and characteristics, payments environment user interaction characteristics, payments environment payment information) received via the interface 106. Additionally the scenario module 108 can store and retrieve a virtual payments environment (e.g., a predetermined virtual payments environment, a preset virtual payments environment, etc.) from the code repository 110 based on the data received from the computing device 102.

The virtual payments environment can model and/or comprise a plurality of activities associated with components of a payments environment. The scenario module 108 can access an activity engine generator 112 to generate/ provide a plurality of activity engines within the virtual payments environment. The plurality of activity engines can model and/or be associated with components of a payments environment such as a point-of-sales (pos) device, a payments network, a payments gateway, and a payment processor, for example. Each activity engine of the plurality of activity engines can comprise a plurality of blockchains that identity, timestamp and store events/transactions associated with the activity engines. As such, issues relating to timing (e.g., timestamps of events and occurrences), performance (e.g., a success or failure of an event or occurrence, and identity (e.g., identification of activity engines and locations in a payments environment associated with events and occurrences) can be managed via blockchains. The blockchains can create and/or be associated with a ledger (e.g., private ledger, open ledger, distributed ledger, shared ledger, public ledger, etc.) that is in a verifiable and persistent.

The activity engines can be linked to and/or in communication with (e.g., via the network 105) devices that the activity engines model and/or represent such as the intermediary device 120. As such, the system can comprise a plurality of intermediary device(s) 120. For example, the scenario module 108 (e.g., activity engine generator 112) can generate an activity engine within the virtual payments environment that simulates a point-of-sales (PUS) device (e.g., PUS activity engine). In an aspect, the activity engine within the virtual payments environment that simulates a point-of-sales (POS) device can be in communication with an intermediary device 120. The intermediary device 120 can be a POS device (e.g., a barcode scanners, a radio frequency identification (RFID) devices, a touchscreen device, a magnetic stripe readers, an electronic funds transfer (EFT) device, a digital weighing scale, a POS receipt printer, a cash drawer, etc.) maintained and/or associated with a merchant. The network device 104 can exchange information with the intermediary device 120. The information exchanged between the network device 104 and the intermediary device 120 can be used by the scenario module 108 to update, modify, reconcile, or compare information/data (e.g., payments information, performance data, etc.) within the virtual payments environment.

The scenario module 108 can comprise the activity engine generator 112. The activity engine generator 112 can generate a plurality of activity engines with a virtual payments environment. For example, the activity engine generator 112 can model and/or generate an activity engine configured to simulate activities associated with a POS device such as currency acceptance, keypad and/or control inputs, chip card reader inputs, swipe card inputs, combinations thereof, and the like. In addition, the network device 104 can receive information (e.g., payments environment information) from the intermediary device 120 that is used to generate, modify, update, and the like the virtual payments environment.

The scenario module 108 (e.g., activity engine generator 112) can generate an activity engine within the virtual payments environment that simulates a network (e.g., a network activity engine). A network activity engine can connect and/or simulate a connection/link between activity engines within the virtual payments environment. A network activity engine can simulate network infrastructure and network related events and occurrences such as network outages, network congestion, changes in network parameters and configurations, network connectivity issues, network traffic management, combinations thereof, and the like.

The scenario module 108 (e.g., activity engine generator 112) can generate an activity engine within the virtual payments environment that simulates a payment gateway device. In an aspect, the activity engine that simulates the payment gateway device (e.g., payment gateway activity engine) can be in communication with the intermediary device 120. The intermediary device 120 can be a payment gateway device. The network device 104 can exchange information with the intermediary device 120. The information exchanged between the network device 104 and the intermediary device 120 can be used by the scenario module 108 to update, modify, reconcile, or compare information/data (e.g., payments information, performance data, etc.) within the virtual payments environment associated with a payments gateway. The activity engine that simulates the payment gateway device can simulate activities associated with a payment gateway device such as currency exchange (e.g., an exchange between fiat currency and cryptocurrency), and management of payment related data (e.g., commercial transaction data, payment card industry data, payment settlement request, etc.) communicated between a POS device and a payment processor. The activity engine that simulates the payment gateway device can simulate activities associated with a payment gateway device based on data provided to the interface 106 (e.g., payments environment hardware characteristics, payments environment performance characteristics, payments environment network criteria and characteristics, payments environment user interaction characteristics, payments environment payment information) by a user.

The scenario module 108 (e.g., activity engine generator 112) can generate an activity engine within the virtual payments environment that simulates a payment processor (e.g., a payment processor device). In an aspect, the activity engine that simulates the payment processor (e.g., payment processor activity engine) can be in communication with the intermediary device 120. The intermediary device 120 can be a device associated with a payment processor (e.g., a payment processor device). The activity engine that simulates the payment processor can be in communication with a payment processor maintained and/or associated with a payment processing entity such as Cayan®, Leaders Merchant Services®, Square®, Payment Cloud®, North American Bancard®, and the like. The network device 104 can exchange information with the intermediary device 120. The information exchanged between the network device 104 and the intermediary device 120 can be used by the scenario module 108 to update, modify, reconcile, or compare information/data (e.g., payments information, performance data, etc.) within the virtual payments environment associated with a payment processor. The activity engine that simulates the payment processor can simulate activities associated with a payment processor such as can managing/verifying payment card (e.g., bank card, credit card, debit card, gift card, etc.) associations with merchants and financial institutions, determining payment authorization information, and determining payment settlement information.

In addition a POS activity engine, a network activity engine, a payment gateway activity engine, and a payment processor activity engine, the scenario module 108 can generate and/or provide any other type of activity engine within the virtual payments environment. For example, the scenario module 108 (e.g., activity engine generator 112) can generate an activity engine that is used to simulate fraud and payment integrity issues within a virtual payments environment. For example, a fraud/integrity activity engine can be used to simulate payment phishing schemes, payment card fraud, unauthorized payment account access and/or use, combinations thereof and the like. In an aspect, any other type of activity engine associated with payments can be generated/provided by the scenario module 108. Additionally, a virtual payments environment can comprise or exclude any type of activity engine and/or any number of activity engines based on a scenario.

A scenario generated/provided by the scenario module 108 and associated with a virtual payments environment can also be associated with a time window (e.g., a start time, an end time, a duration, etc.). The scenario module 108 can generate/provide a scenario associated with a payments environment such as commercial activity during a time window such as a seasonal event. For example, the scenario module 108 can generate/provide a scenario associated with a payment environment such as commercial activity during a Black-Friday holiday, a Christmas Holiday season, a maintenance downtime, a back-to-school shopping period, etc. The scenario module 108 can simulate events associated with the scenarios that are either typical or atypical in a payments environment. For example, the scenario module 108 can simulate events within the virtual payments environment such as fraudulent transactions (e.g., payment card theft, payment card replication, unauthorized access to a payment account, etc.), an incorrect pin used in association with a payment card (e.g., credit card, debit card, rewards cards, gift cards, etc.), and merchant type payment acceptance/rejection (e.g., merchants that only accept certain forms of payments, etc.).

The network device 104 can transmit data indicative of the virtual payments environment to the computing device 102. The computing device 102, based on the data indicative of the virtual payments environment can access and/or display the virtual payments environment (e.g., one or more scenarios associated with the virtual payments environment) via the interface 106. A user of the computing device 102 can use the interface 106 to introduce payment packets (e.g., payment information) to the virtual payments environment. For example, the computing device 102 can transmit a payment packet to the network device 104. The network device 104 can use the scenario module 108 to introduce the payment packet (e.g., payment information) into the virtual payments environment. The payment packet can be used to simulate actual currency exchanged and/or payments managed by a payments system and/or payment environment (e.g., a real-world commercial environment).

Payment packets can include payment card industry (PCI) data such as an account number, a payment card status, a verification code, a merchant identifier, cryptocurrency, foreign exchange currency information, a combination thereof, and the like. Payment packets can be created and processed according to activities associated with the plurality of activity engines within the virtual payments environment. For example, payment packets can be processed by one or more activity engines associated with a point-of-sales (POS) device, a payment gateway, a payment processor, a network, combinations thereof, and the like. The one or more activity engines can be associated with a transactional path that that the payment packets traverses through the virtual payments environment.

The payment packets (e.g., payment information) can traverse the virtual payments environment according to a scenario generated/provided by the scenario module 108. For example, a payment packet introduced to a virtual payments environment/scenario can be processed first by an activity engine that simulates a point-of-sales device (e.g., a POS activity engine). The payment packet can comprise information such account information, a card status, verification codes, an identifier that identifies a merchant with whom the point-of-sales device is associated with (e.g., a merchant ID), or any other similar information. The payment packet can comprise information determined by a user and provided to the computing device 102 via the interface 106. Additionally, the payment packet can comprise information derived and/or received from a source, remote device, third party and the like, such as a POS device associated with a merchant (e.g., intermediary device 120), for example.

The POS activity engine can simulate any events that are typically and/or atypically associated with a POS device (e.g., intermediary device 120). For example, the POS activity engine can simulate events such as swipe of a payment card (e.g., the payment packet) through a magnetic card reader. Alternatively, the POS activity engine can simulate activities associated with the POS device associated with a merchant (e.g., intermediary device 120) based on the information derived and/or received from the POS device. The POS activity engine can introduce additional events/occurrences associated with the payment packet such as "a wrong pin used in association with a payment card", "a detection of fraudulent activity associated with the payment card", "errors with the POS device", and the like, for example. Activity engines can simulate any type of event/occurrence associated with a payments environment such as an increase or reduction of commercial volume in a region, payment system failures, network outages, combinations thereof, and the like, for example.

If, during the simulation, the swipe of the payment card is a success, the POS activity engine can tag the payment packet with an identifier (e.g., a performance identifier) that indicates that the transaction was a success. If, during the simulation, the swipe of the payment card is a failure, the POS activity engine can tag the payment packet with an identifier (e.g., a performance identifier) that indicates that the transaction was a failure. A record of the success or failure can be stored in a data repository, such as performance module 116 and reviewed as performance data.

If the swipe of the payment card is a success, the payment packet can progress to a next activity engine (e.g., a payment gateway activity engine, a payment processor activity engine, etc.) within the virtual payments environment. In the same manner as the POS activity engine, each activity engine along a transactional path through the virtual payments environment can tag the payment packet with an identifier indicating the success or failure of the payment packet's traversal through (e.g., processing by) the respective activity engine. A record of performance (e.g., success, failure, errors, performance data, etc.) can be associated with each activity engine within the virtual payments environment. The records of performance can be stored in the performance module 116. The network device 104 can transmit the records of performance to the computing device 102. The records of performance can be displayed to a user via the interface 106 as performance data. The records of performance can be displayed to a user via the interface 106 as a graphical representation of the transactional path and status of each component (e.g., activity engine) of the virtual payments environment. For each activity engine within the virtual payments environment, the performance data can detail information such as how many payment packets failed, identify the respective activity engine, detail a size of a buffer associated with the activity engine, and any other similar and/or related performance data. Additionally, each activity engine can be accessed to review performance of payment packets as they transverse components (e.g., blockchains) of the respective activity engine. The performance data can be used to modify, compare, and reconcile real-world data (e.g., a public ledger, payment card transaction history, data received from a device such as intermediary device 120, etc.) associated with a real-word payment product (e.g., a payment card, cryptocurrency, etc.).

Figure 2:
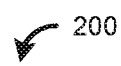
FIG. 2 is a diagram of a payment packet.

FIG. 2 is a block diagram of a payment packet (e.g., payment information) according to the present methods and systems for providing a virtual payments environment. A payment packet can be a proprietary product and thus comprise a wide variety of information. A payment packet 200 is a formatted unit of data/information used to traverse a transactional path through a virtual payments environment according to a scenario. The payment packet 200 can comprise identifier information 204. The identifier information 204 can be an identifier that indicates an activity engine of a plurality of activity engines within the virtual payments environment/scenario that the payment packet was initially introduced to.

The payment packet 200 can comprise location information 206. The location information 206 can be a field comprising a number of identifiers in a chronological order. The identifiers can be associated with activity engines of the plurality of activity engines within the virtual payments environment/scenario that the payment packet 200 has traversed and/or been processed by. For example, the location information 206 can comprise identifiers associated with the last five activity engines/locations that processed the payment packet 200. The location information 206 can comprise any number identifiers associated with activity engines of the plurality of activity engines. For example, the number of identifiers associated with activity engines of the plurality of activity engines in the location information 206 can be determined by a user providing characteristics/settings/preferences to a user interface (e.g., user interface 106) prior to the virtual payments environment/scenario being generated/provided. Additionally, the number of identifiers associated with activity engines of the plurality of activity engines in the location information 206 can be automatically determined by a device (e.g., computing device 102, network device 104) associated with the virtual payments environment/scenario. The location information 206 can comprise identifiers and or any other information that identifies a plurality of locations/activity engines associated with the payment packet 200 (e.g., locations associated with a transactional path traversed through a virtual payments environment by the payment packet 200).

The payment packet 200 can comprise transactional information 208. The transactional information 208 can be a field comprising information such as a payment type (e.g., credit card payment, debit card payment, gift card payment, rewards card payment, cryptocurrency payment, currency payment, etc.), a value (e.g., payment card value, purchase item value, cryptocurrency value), a payment location (e.g., merchant identifier), or any other information. The transactional information 208 can comprise transactional information associated with a plurality of activity engines associated with the payment packet 200 (e.g., transactions associated with a transactional path comprising activity engines traversed through a virtual payments environment by the payment packet 200).

The payment packet 200 can comprise timing information 210. The timing information 210 can be a field comprising one or more timestamps. The timestamps can correspond to times that events/occurrences (e.g., blockchains) take place within the virtual payments environment/scenario. For example, if the payment packet 200 is introduced to the virtual payments environment/scenario at 1:00 PM, then the timing data 210 can comprise a timestamp reflecting 1:00 PM. If the payment packet 200 exits (e.g., processing completed) an activity engine at 2:00 PM, then the timing data 210 can comprise a timestamp reflecting 2:00 PM. The introduction of a payment packet to the virtual payments environment/scenario and the payment packet exiting the activity engine (e.g., post processing) can be managed by blockchains associated with the activity, engines. The blockchains can create and/or be associated with a ledger (e.g., private ledger, open ledger, distributed ledger, shared ledger, public ledger, etc.) that is in a verifiable and persistent. Therefore each event and/or occurrence within and/or associated with the virtual payments environment/scenario can be accessed, reviewed, and analyzed as performance data.

The payment packet 200 can comprise performance data 212. The performance data 212 can be a field that indicates the success or failure of an action associated with an activity engine of the plurality of activity engines within the virtual payments environment/scenario. For example, if, during a simulation associated with the virtual payments environment/scenario, a simulated swipe of the payment card is a successfully processed by an activity engine that simulates a point-of-sales (POS) device, then the activity engine can tag the payment packet 200 with an identifier (e.g., a performance identifier) that indicates that the transaction was a success. If, during the simulation, the swipe of the payment card is a failure, the POS activity engine can tag the payment packet 200 with an identifier (e.g., a performance identifier) that indicates that the transaction was a failure. The performance data 212 can comprise a plurality of identifiers indicating whether the activities associated with the plurality of activity engines are a success or a failure. Each of the plurality of identifiers can be associated with a blockchain that is associated with an activity engine. An activity engine can comprise any number of blockchains (e.g., activities).

Figure 3:
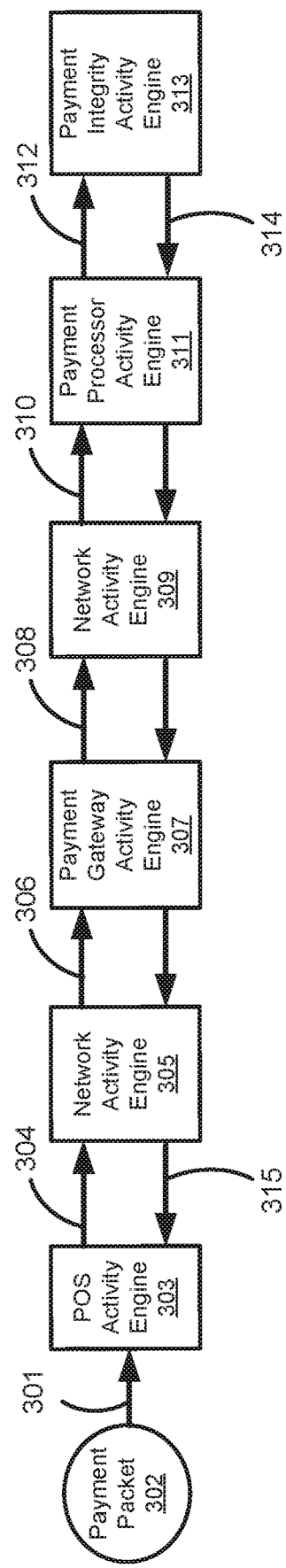
FIG. 3 is a block diagram of a transactional path associated with a payment packet.

FIG. 3 is a block diagram of a transactional path that a payment packet can traverse through a virtual payments environment according to a scenario. A payment packet 302 can be used to simulate actual currency exchanged and/or payments managed by a payments system and/or payment environment (e.g., a real-world commercial environment). The payment packet 302 can be introduced to a virtual payments environment/scenario comprising a plurality of activity engines (e.g., a POS activity engine 302, a network activity engine, a payment gateway activity engine 304, a network activity engine, a payment processor activity engine 306, and a payment integrity activity engine). Each activity engine of the plurality of activity engines can comprise a plurality of blockchains that identity, timestamp and store events/transactions associated with the activity engines. Thus the blockchains can create and/or be associated with a ledger (e.g., private ledger, open ledger, distributed ledger, shared ledger, public ledger, etc.) that is in a verifiable and persistent.

At 301, the start of a transactional path through the virtual payments environment/scenario, the payment packet 302 can be processed by a point-of-sales (POS) activity engine 303. Scenario/simulation characteristics (e.g., settings) received from a user via an interface (e.g., interface 106) can be used to determine activities the POS activity engine 303 can/will perform during a simulation associated with the virtual payments environment/scenario. For example, the POS activity engine 303 can simulate activities associated with a POS device such as currency acceptance, keypad and/or control inputs, chip card reader inputs, swipe card inputs, combinations thereof, and the like. If the payment packet 302 successfully exits (e.g., processed without error) the POS activity engine 303, the POS activity engine 303 can tag/stamp the payment packet 302 with an application identifier (e.g., identifier information 204), and an identifier that indicates success (e.g., performance data 212). If the payment packet 302 is unsuccessful (e.g., processed with error, corrupted, etc.) in traversing the POS activity engine 303, the PUS activity engine 303 can tag/stamp the payment packet 302 with an application identifier (e.g., identifier information 204), and an identifier that indicates a failure. If the payment packet 302 successfully exits (e.g., processed without error) the PUS activity engine 302, the payment packet 302 can progress at 304 to the network activity engine 305. Data indicative of the success or failure can be logged (e.g., performance data 212) and stored (e.g., via performance module 116) according to blockchains associated with the POS activity engine 302.

The network activity engine 305 can connect and/or simulate a connection between the PUS activity engine 302 and the payment gateway activity engine 307. The network activity engine 305 can simulate network infrastructure and network related events and occurrences such as network outages, network congestion, changes in network parameters and configurations, network connectivity issues, network traffic management, combinations thereof, and the like. The network activity engine 305 can be configured, based on one or more performance settings, to queue, buffer, discard, delay and the like, the payment packet 302 as the payment packet 302 is processed by the PUS activity engine 303 and/or the payment gateway activity engine 307. If the payment packet 302 successfully exits (e.g., processed without error) the network activity engine 305, the network activity engine 305 can tag/stamp the payment packet 302 with an application identifier (e.g., identifier information 204), and an identifier that indicates success (e.g., performance data 212). If the payment packet 302 is unsuccessful (e.g., processed with error, corrupted, etc.) in traversing the network activity engine 305, the network activity engine 305 can tag/stamp the payment packet 302 with an application identifier (e.g., identifier information 204), and an identifier that indicates a failure. If the payment packet 302 successfully exits (e.g., processed without error) the network activity engine 305, the payment packet 302 can progress at 306 to the payment gateway activity engine 307. Data indicative of the success or failure can be logged (e.g., performance data 212) and stored (e.g., via performance module 116) according to blockchains associated with the network activity engine 305.

The payment gateway activity engine 307 can simulate activities associated with a payment gateway device such as currency exchange (e.g., an exchange between fiat currency and cryptocurrency), and management of payment related data (e.g., commercial transaction data, payment card industry data, payment settlement request, etc.) communicated between a POS device and a payment processor. The activity engine that simulates the payment gateway device can simulate activities associated with a payment gateway device based on data provided to the interface 106 (e.g., payments environment hardware characteristics, payments environment performance characteristics, payments environment network criteria and characteristics, payments environment user interaction characteristics, payments environment payment information) by a user. If the payment packet 302 successfully exits (e.g., processed without error) the payment gateway activity engine 307, the payment gateway activity engine 307 can tag/stamp the payment packet 302 with an application identifier (e.g., identifier information 204), and an identifier that indicates success (e.g., performance data 212). If the payment packet 302 is unsuccessful (e.g., processed with error, corrupted, etc.) in traversing the payment gateway activity engine 307, the payment gateway activity engine 307 can tag/stamp the payment packet 302 with an application identifier (e.g., identifier information 204), and an identifier that indicates a failure. If the payment packet 302 successfully exits (e.g., processed without error) the payment gateway activity engine 307, the payment packet 302 can progress to at 308 to the network activity engine 309. Data indicative of the success or failure can be logged (e.g., performance data 212) and stored (e.g., via performance module 116) according to blockchains associated with the payment gateway activity engine 307.

The network activity engine 309 can connect and/or simulate a connection between the payment gateway activity engine 307 and the payment processor activity engine 311. The network activity engine 309 can simulate network infrastructure and network related events and occurrences such as network outages, network congestion, changes in network parameters and configurations, network connectivity issues, network traffic management, combinations thereof, and the like. The network activity engine 309 can be configured, based on one or more performance settings, to queue, buffer, discard, delay and the like, the payment packet 302 as the payment packet 302 is processed by the payment gateway activity engine 307 and/or the payment processor activity engine 311. If the payment packet 302 successfully exits (e.g., processed without error) the network activity engine 309, the network activity engine 309 can tag/stamp the payment packet 302 with an application identifier (e.g., identifier information 204), and an identifier that indicates success (e.g., performance data 212). If the payment packet 302 is unsuccessful (e.g., processed with error, corrupted, etc.) in traversing the network activity engine 309, the network activity engine 309 can tag/stamp the payment packet 302 with an application identifier (e.g., identifier information 204), and an identifier that indicates a failure. If the payment packet 302 successfully exits (e.g., processed without error) the network activity engine 309, the payment packet 302 can progress at 310 to the payment processor activity engine 311. Data indicative of the success or failure can be logged (e.g., performance data 212) and stored (e.g., via performance module 116) according to blockchains associated with the network activity engine 309.

The payment processor activity engine 311 can simulate a payment processor (e.g., a payment processor device, intermediary device 120). The payment processor activity engine 311 can simulate a payment processing device/entity such as Cayan®, Leaders Merchant Services®, Square®, Payment Cloud®, North American Bancard®, and the like. The payment processor activity engine 311 can simulate activities associated with a payment processor such as can managing/verifying payment card (e.g., bank card, credit card, debit card, gift card, etc.) associations with merchants and financial institutions, determining payment authorization information, and determining payment settlement information. For example, the payment processor activity engine 311 can simulate an authorization of a payment card used at a POS device (e.g., POS activity engine 303, intermediary device 106) simulated by the payment packet 302. If the payment packet 302 successfully exits (e.g., processed without error) the payment processor activity engine 311, the payment processor activity engine 311 can tag/stamp the payment packet 302 with an application identifier (e.g., identifier information 204), and an identifier that indicates a success (e.g., performance data 212). If the payment packet 302 is unsuccessful (e.g., processed with error, corrupted, etc.) in traversing the payment processor activity engine 311, the payment processor activity engine 311 can tag/stamp the payment packet 302 with an application identifier (e.g., identifier information 204), and an identifier that indicates a failure. If the payment packet 302 successfully exits (e.g., processed without error) the payment processor activity engine 311, the payment packet 302 can progress at 312 to the payment integrity activity engine 313. Data indicative of the success or failure can be logged (e.g., performance data 212) and stored (e.g., via performance module 116) according to blockchains associated with the payment processor activity engine 311.

The payment integrity activity engine 313 can simulate fraud and/or any other payment integrity issues within the virtual payments environment/scenario. The payment integrity activity engine 313 can simulate payment phishing schemes, payment card fraud, unauthorized payment account access and/or use, combinations thereof and the like. For example, the payment integrity activity engine 313 can simulate fraudulent transactions (e.g., payment card theft, payment card replication, unauthorized access to a payment account, etc.) and/or an incorrect pin used in association with a payment card (e.g., credit card, debit card, rewards cards, gift cards, etc.). If the payment packet 302 successfully exits (e.g., processed without error) the payment integrity activity engine 313, the payment integrity activity engine 313 can tag/stamp the payment packet 302 with an application identifier (e.g., identifier information 204), and an identifier that indicates a success (e.g., performance data 212). If the payment packet 302 is unsuccessful (e.g., processed with error, corrupted, etc.) in traversing the payment integrity activity engine 313, the payment integrity activity engine 313 can tag/stamp the payment packet 302 with an application identifier (e.g., identifier information 204), and an identifier that indicates a failure. Data indicative of the success or failure can be logged (e.g., performance data 212) and stored (e.g., via performance module 116) according to blockchains associated with the payment integrity activity engine 313.

If the payment packet 302 successfully exits (e.g., processed without error) the payment integrity activity engine 313, the payment packet 302 can be routed at 314 back through each of the activity engines in a reverse order, with the transactional path terminating at 315 at the POS activity engine 303. Routing the payment packet 302 back through each of the activity engines in a reverse order, with the transactional path terminating at 315 at the POS activity engine 303 can represent/simulate a complete lifecycle for the payment packet 302 through the virtual payments environment/scenario. Performance data indicative of the successes and failures associated with the payment packet 302 as it traversed the virtual payments environment/scenario can be logged and stored by a plurality blockchains (e.g., performance module 116) associated with each of the activity engines (e.g., POS activity engine 303, network activity engine 305, payment gateway activity engine 307, network activity engine 309, payment processor activity engine 311, and payment integrity activity engine 313).

The virtual payments environment can comprise any number of activity engines. Additionally, the virtual payments environment can comprise any type of activity engines that can be associated with a payments environment. Performance data can be accessed, reviewed, and analyzed, at any point along the transactional path. The performance data can indicate a success/failure in processing the payment packet 302, where along the transactional path the success/failure occurred (e.g., pre-activity engine, post-activity engine, during an activity engine process/activity), statistical data, and or any other analytical data associated with the payment packet 302. Additionally, at any point along the transactional path, various events and/or occurrences can be introduced to the virtual payments environment/scenario such as a simulation of fraud associated with a payment packet, user errors (e.g., improper card swipe, wrong pin) associated with a payment packet, commercial volumes associated with a payments environment, combinations thereof, and the like, for example.

The performance of the payment packet 302 (e.g., performance data) as it traverses a transactional path (e.g., pre-activity engine, post-activity engine, during an activity engine process/activity) through the virtual payments environment/scenario can be displayed (e.g., via interface 106) and reviewed by a user. The performance data can be used to modify, compare, and reconcile real-world data (e.g., a public ledger, payment card transaction history) associated with a real-word payment product (e.g., a payment card, cryptocurrency, etc.).

Figure 4:
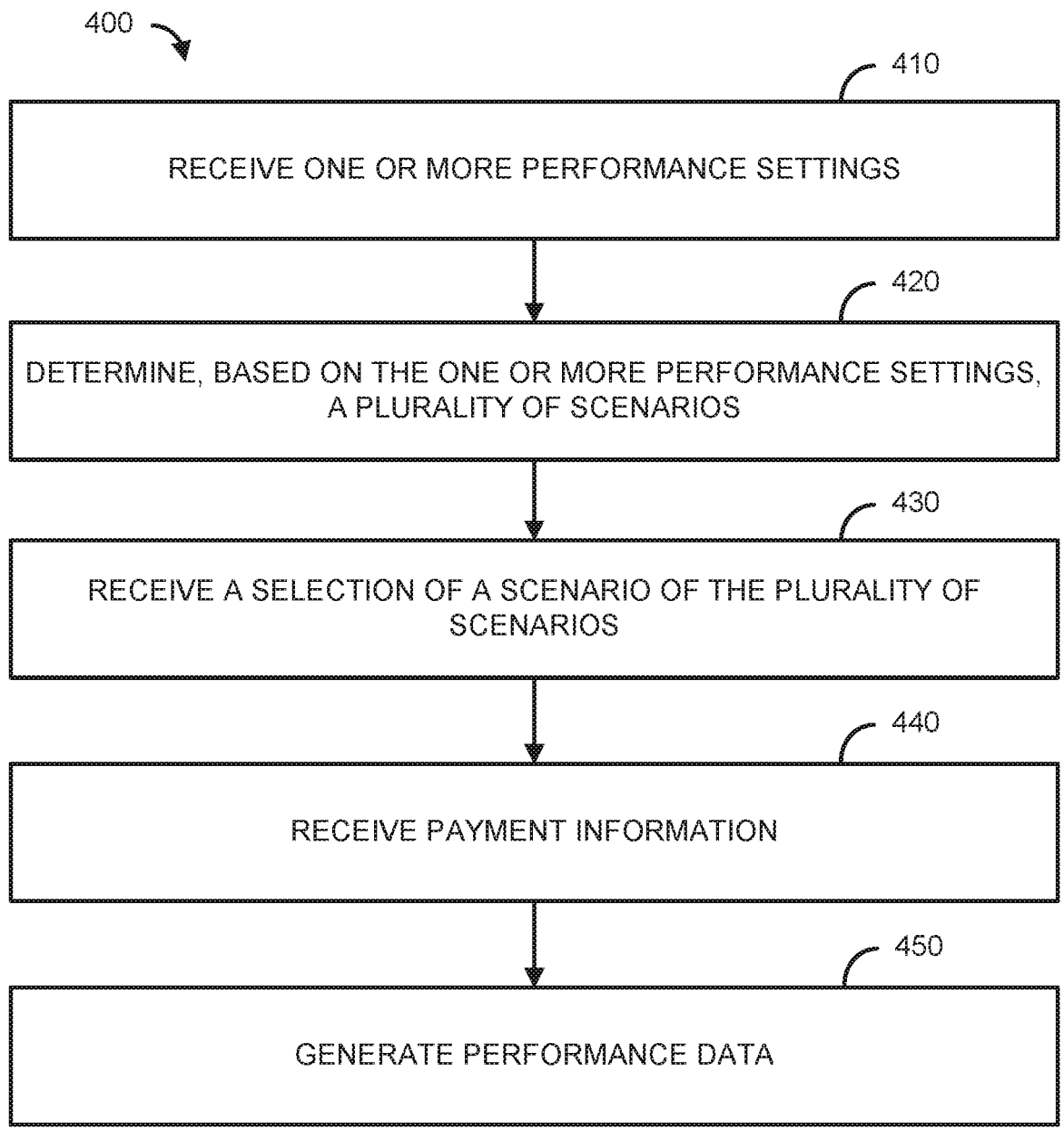
FIG. 4 is a flowchart of an example method.

FIG. 4 is a flowchart of an example method 400. At 410 a computing device can receive one or more performance settings (e.g., performance characteristics). The computing device (e.g., computing device 102) can be a device such as a computer, a smartphone, a laptop, a tablet, a smart device, a display device, and the like. The computing device can receive the one or more performance settings via an interface (e.g., interface 106) configured with and/or associated with the computing device. The interface can be a graphical user interface (GUI), application, web browser, or a combination thereof. The one or more performance settings can be associated with a payments environment such as hardware components (e.g., a type of point-of-sales device, computing terminals, etc.), commercial characteristics (e.g., commercial volume, commercial time periods, commercial outlets, etc. networking criteria (e.g., network devices, network configurations, bandwidth, type of network traffic, etc.), an amount of user interactions (e.g., commercial volume), a type of user interactions (e.g., user payment card swipe, user pin entering errors associated with a payment card, abnormal user purchases and payment activity, etc.), and environmental restrictions (e.g., weather conditions in a commercial area/region, system failures due to natural disasters, etc.). The performance settings can be used to generate/provide a virtual payments environment. The virtual payments environment can model/simulate a real-world payments environment (e.g., a commercial transaction environment, commercial situation, etc.). Within the virtual payments environment, any number of scenarios (e.g., simulations) associated with the virtual payments environment and/or a commercial environment can be determined and/or generated (e.g., determined and/or generated via the scenario module 108).

At 420 a plurality of scenarios associated with the virtual payments environment can be determined. The plurality of scenarios can be determined and/or generated based on the performance settings. In an aspect, the computing device can transmit/provide the performance settings to a device (e.g., network device 104) that determines and/or generates the plurality of scenarios (e.g., via scenario module 108) based on the performance settings. The one or more determined/generated scenarios can be provided/presented to a user via the interface (e.g., interface 106). In an aspect, the computing device can determine that at least one of the performance settings match scenario information stored in a database (e.g., database 114). The computing device, based on the scenario information stored in the database can retrieve one or more preset/predetermined scenarios from the database. Additionally, the computing device can determine that a threshold number of the performance settings do not match the scenario information stored in the database. For example, a user can provide four performance settings: a payment type, a payment volume, a number of payment errors, and network configurations. The computing device can be configured to match at least two performance settings with the scenario information stored in the database (e.g., threshold=2). If the computing device is unable to match at least two of the performance settings received to the scenario information, then the computing device (e.g., via the network device) can generate (e.g., cause generation of) a plurality of scenarios that match at least two of the performance settings. For example, a performance setting such as "payment activity during a holiday season" can cause the generation (e.g., generated by the scenario module 108) and/or retrieval (e.g., retrieved from the database 114) of a plurality of scenarios where commercial activity is occurring during one or more holiday seasons (e.g., commercial activity during Christmas, commercial activity during Black Friday, etc.). Additionally, based on the performance settings, one or more preset/predetermined scenarios can be provided/presented to the user via the interface (e.g., interface 106).

At 430 the computing device can receive a selection of a scenario of the plurality of scenarios. For example, the user can use the interface (e.g., interface 106) to select a scenario from the plurality of scenarios that adheres to the performance settings provided. Each of the plurality of scenarios can be associated with a time window/duration. The time period/duration can be determined by the user and provided to the computing device as a performance setting. Additionally, the time period/duration can be automatically determined by the computing device by associating the scenarios with real-world payments environments, events, and occurrences. For example, a performance setting such as "payment activity during a holiday season" can cause the generation and/or retrieval of a plurality of scenarios where commercial activity is occurring during one or more holiday seasons, and the time window setting can cause a filter of the generated/retrieved plurality of scenarios such that only scenarios where payments activity occurs during a certain time (e.g., payments occurring during business hours) for a certain duration (e.g., payments occurring over a two-day period).

At 440 the computing device can receive payment information. The computing device can receive the payment information from the user via the interface (e.g., interface 106). The payment information can be a package of information (e.g., a payment packet, payment packet 200) to be processed according the scenario. The payment information can include payment card industry data such as an account number, a payment card status, a verification code, a merchant identifier, cryptocurrency, foreign exchange currency information, a currency value, a combination thereof, and the like. The payment information can be processed according to a plurality of activities/activity engines associated with the scenario created within the virtual payments environment. The scenario can comprise of or more activity engines that simulate real-world components of a payments environment within the virtual payments environment. The scenario can be based on at least a portion of the one or more performance settings. The payment information can be processed by and/or according to one or more activity engines determined based on the one or more performance settings. For example, the payment information can be processed by and/or according to one or more activity engines associated with a point-of-sales (POS) device, a payment gateway, a payment processor, a network, combinations thereof, and the like.

At 450 the computing device can generate performance data. The performance data can indicate a success or failure of an activity engine in processing the payment information. For example, if, during a simulation associated with the scenario, a simulated swipe of the payment card is a successfully processed by an activity engine that simulates a point-of-sales (POS) device, then the activity engine can tag the payment information with an identifier (e.g., a performance identifier) that indicates that the transaction was a success. If, during the simulation, the swipe of the payment card is a failure, the activity engine that simulates the point-of-sales (POS) device can tag the payment information with an identifier (e.g., a performance identifier) that indicates that the transaction was a failure. The performance data can comprise a plurality of identifiers indicating whether the activities associated with the plurality of activity engines are a success or a failure. The performance data, based on the plurality of identifiers, can comprise and/or indicate a transactional path that the payment information traversed during the scenario within the virtual payments environment. The user can view and/or access the performance data via the interface (e.g., interface 106) configured with and/or associated with the computing device. The performance data can be used to modify, compare, and reconcile real-world data (e.g., a public ledger, payment card transaction history) associated with a real-word payment product (e.g., a payment card, cryptocurrency, etc.). As such, the performance data can be associated with one or more of a public ledger, a payment asset (e.g., payment card, currency, cryptocurrency, etc.), a combination thereof, and the like.

Figure 5:
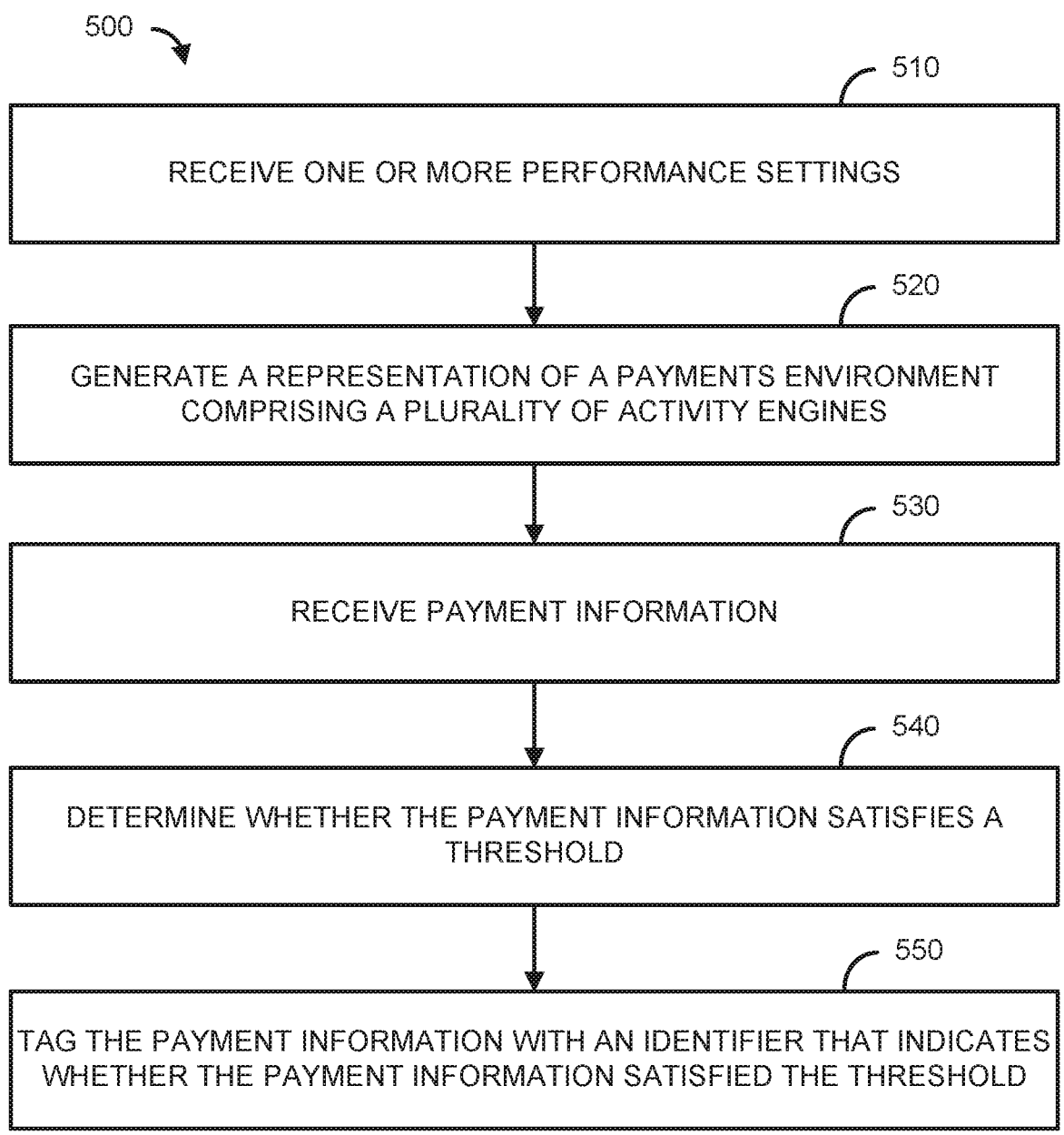
FIG. 5 is a flowchart of an example method.

FIG. 5 is a flowchart of an example method 500. At 510 a network device can receive one or more performance settings (e.g., performance characteristics). The network device (e.g., network device 104) can be a device such as a computer, a server, a cloud-based device, and the like. The network device can receive the one or more performance settings from a device such as a computing device (e.g., computing device 102). The one or more performance settings can be associated with a payments environment such as hardware components (e.g., a type of point-of-sales device, computing terminals, etc. commercial characteristics (e.g., commercial volume, commercial time periods, commercial outlets, etc.), networking criteria network devices, network configurations, bandwidth, type of network traffic, etc.), an amount of user interactions (e.g., commercial volume), a type of user interactions (e.g., user payment card swipe, user pin entering errors associated with a payment card, abnormal user purchases and payment activity, etc.), and environmental restrictions (e.g., weather conditions in a commercial area/region, system failures due to natural disasters, etc.). The performance settings can be used to generate/provide a virtual payments environment. The virtual payments environment can model/simulate a real-world payments environment (e.g., a commercial transaction environment, commercial situation, etc.). Within the virtual payments environment, any number of scenarios (e.g., simulations) associated with the virtual payments environment and/or a commercial environment can be determined.

At 510 the network device can generate a representation of a payments environment (e.g., a virtual payments environment). The network device can generate the representation of the payments environment, based on the one or more performance settings received from the computing device. The payments environment can comprises a plurality of activity engines. The plurality of activity engines can simulate real-world components of a payments environment within the representation of the payments environment. For example, one or more of the plurality of activity engines can simulate a point-of-sales (POS) device, a payment gateway, a payment processor, a network, combinations thereof, and the like.

At 520 the network device can receive payment information. The network device can receive the payment information from the computing device. The payment information can be a package of information (e.g., a payment packet, payment packet 200) to be processed by one or more of the plurality of activity engines. The payment information can include payment card industry data such as an account number, a payment card status, a verification code, a merchant identifier, cryptocurrency, foreign exchange currency information, a currency value, a combination thereof, and the like. The payment information can be a proprietary package of information that includes a variety of proprietary information and data structures associated with one or more payment processors/payment products such as consortium data formats, for example.

The payment information can be processed according to activities associated with the one or more of the plurality of activity engines. The representation of the payments environment can be configured, based on the one or more performance settings, to queue, buffer, discard, delay and the like the payment information as the payment information is processed by each activity engine of the plurality of activity engines (e.g., as the payment information traverses a scenario/simulation according to the representation of the payments environment).

At 530 the network device can determine via each activity engine of the plurality of activity engines whether the payment information satisfies a threshold associated with the activity engine. The threshold can be based on processing the payment information. For example, the payment information can satisfy the threshold if an activity engine of the plurality of activity engines successfully processes the payment information. Processing the payment information can be deemed successful if the payment information undergoes activities associated with an activity engine without errors. For example, if a payment packet is introduced to an activity engine that simulates a point-of-sales device, and the a successful payments card swipe is simulated in association with the payment information, then processing of the payment information by the activity engine that simulates the point-of-sales device can be deemed successful and the threshold satisfied.

At 540 the network device can tag the payment information (e.g., payment packet 200) with an identifier associated with each activity engine of a plurality of activity engines. The identifier associated with each activity engine of a plurality of activity engines wherein the identifier indicates whether the payment information satisfied the threshold corresponding with each activity engine. For example, if, during a simulation associated with the representation of the payments environment, a simulated swipe of the payment card is a successfully processed by the activity engine that simulates the point-of-sales device, then the activity engine can tag the payment information (e.g., payment packet 200) with an identifier (e.g., a performance data 212, performance identifier, etc.) that indicates that the transaction was a success satisfied the threshold). If, during the simulation, the swipe of the payment card is a failure, the activity engine that simulates the point-of-sales device can tag the payment information with an identifier (e.g., performance data 212, a performance identifier, etc.) that indicates that the transaction was a failure.

Figure 6:
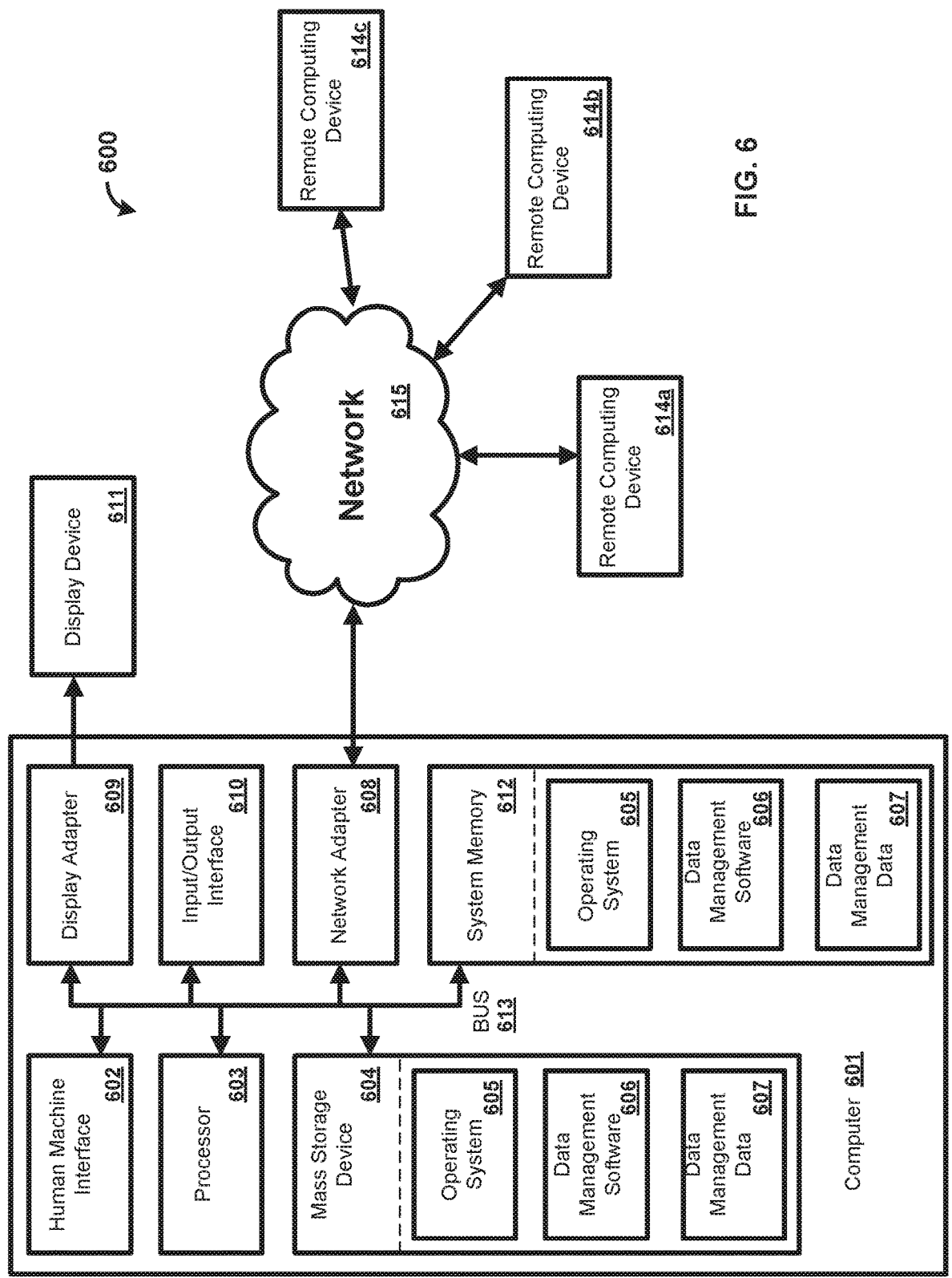
FIG. 6 is a block diagram of an example computing device.

In an exemplary aspect, the methods and systems can be implemented on a computer 601 as illustrated in FIG. 6 and described below. By way of example, computing device 102, network device 104, and intermediary device 120 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the one or more processors 603, a mass storage device 604, an operating system 605, XXX software 606, scenario data 607, a network adapter 608, the system memory 612, an Input/Output Interface 610, a display adapter 609, a display device 611, and a human machine interface 202, can be contained within one or more remote computing devices 214a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the scenario data 607 and/or program modules such as the operating system 605 and the virtual payments environment software 606 that are immediately accessible to and/or are presently operated on by the one or more processors 203.

In another aspect, the computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the virtual payments environment software 606. Each of the operating system 605 and the virtual payments environment software 206 (or some combination thereof) can comprise elements of the programming and the virtual payments environment software 606. The scenario data 607 can also be stored on the mass storage device 604. The scenario data 607 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the virtual payments environment software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with specific examples, it is not intended that the scope be limited to the examples set forth, as the examples herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a network device, one or more performance settings;
generating, based on the one or more performance settings, a representation of a payments environment comprising a plurality of activity engines;
determining, via each activity engine of the plurality of activity engines, that payment information received by the network device satisfies or does not satisfy a threshold associated with the activity engine; and
tagging, via each activity engine of the plurality of activity engines, the payment information with an identifier associated with a blockchain of the activity engine, wherein each identifier indicates that the payment information satisfied or did not satisfy the threshold associated with the activity engine.

2. The method of claim 1, wherein at least one activity engine of the plurality of activity engines is associated with one or more of a point-of-sale (POS) device, a payment gateway, a payment processor, or a network.

3. The method of claim 1, wherein the payment information comprises one or more of an account number, a card status, a verification code, a merchant identifier, or a cryptocurrency identifier.

4. The method of claim 1, wherein receiving the one or more performance settings comprises:
receiving, via an interface associated with a computing device, the one or more performance settings; and
transmitting the one or more performance settings to the network device.

5. The method of claim 1 further comprising generating, based on the tagged payment information, performance data comprising a transactional path associated with the payment information.

6. The method of claim 5, further comprising causing display of the performance data via one or more of a graphical user interface (GUI), an application, or a web browser.

7. The method of claim 5, wherein the transactional path is indicative of an order by which each activity engine of the plurality of activity engines processed the payment information.

8. An apparatus comprising:
one or more processors; and
a memory storing thereon processor executable instructions that, when executed by the one or more processors, cause the apparatus to:
receive, by a network device, one or more performance settings;
generate, based on the one or more performance settings, a representation of a payments environment comprising a plurality of activity engines;
determine, via each activity engine of the plurality of activity engines, that payment information received by the network device satisfies or does not satisfy a threshold associated with the activity engine; and
tag, via each activity engine of the plurality of activity engines, the payment information with an identifier associated with a blockchain of the activity engine, wherein each identifier indicates that the payment information satisfied or did not satisfy the threshold associated with the activity engine.

9. The apparatus of claim 8, wherein at least one activity engine of the plurality of activity engines is associated with one or more of a point-of-sale (POS) device, a payment gateway, a payment processor, or a network.

10. The apparatus of claim 8, wherein the payment information comprises one or more of an account number, a card status, a verification code, a merchant identifier, or a cryptocurrency identifier.

11. The apparatus of claim 8, wherein the processor executable instructions that, when executed by the one or more processors, cause the apparatus to receive the one or more performance settings further cause the apparatus to:
receive, via an interface associated with a computing device, the one or more performance settings; and
transmit the one or more performance setting to the network device.

12. The apparatus of claim 8, wherein the processor executable instructions further cause the apparatus to:
generate, based on the tagged payment information, performance data comprising a transactional path associated with the payment information.

13. The apparatus of claim 12, wherein the processor executable instructions further cause the apparatus to:
display the performance data via one or more of a graphical user intergace (GUI), an application, or a web browser.

14. The apparatus of claim 12, wherein the transactional path is indicative of an order by which each activity engine of the plurality of activity engines processed the payment information.

15. A system comprising:
a network device configured to:
receive one or more performance settings;
generate, based on the one or more performance settings, a representation of a payments environment comprising a plurality of activity engines; and
receive payment information;
and
a plurality of activity engines, each configured to:
determine that the payment information satisfies or does not satisfy a threshold. associated with the activity engine; and
tag the payment information with an identifier associated with a blockchain of the activity engine, wherein the identifier indicates that the payment information satisfied or did not satisfy the threshold associated with the activity engine.

16. The system of claim 15, wherein at least one activity engine of the plurality of activity engines is associated with one or more of a point-of-sale (POS) device, a payment gateway, a payment processor, or a network.

17. The system of claim 15, wherein the payment information comprises one or more of an account number, a card status, a verification code, a merchant identifier, or a cryptocurrency identifier.

18. The system of claim 15, further comprising an interface configured to:
- receive the one or more performance settings; and
- transmit the one or more performance settings to the network device.

19. The system of claim 15, wherein each activity engine of the plurality of activity engines is further configured to:
- generate, based on the tagged payment information, performance data comprising a transactional path associated with the payment information.

20. The system of claim 19, wherein the transactional path is indicative of an order by which each activity engine of the plurality of activity engines processed the payment information.

* * * * *